US008985505B2

(12) United States Patent
Briancourt (10) Patent No.: US 8,985,505 B2
(45) Date of Patent: Mar. 24, 2015

(54) AIRCRAFT LANDING GEAR (75) Inventor: Stephen Paul Briancourt, Bristol (GB)

(73) Assignee: Airbus Operations Limited, Bristol (GB)

( * ) Notice: Subject to any disclaimer, the term of this patent is extended or adjusted under 35 U.S.C. 154(b) by 192 days.

(21) Appl. No.: 13/529,150

(22) Filed: Jun. 21, 2012

(65) Prior Publication Data

US 2014/0061372 A1 Mar. 6, 2014

(30) Foreign Application Priority Data

Jun. 23, 2011 (GB) .................................. 1110635.8

(51) Int. Cl.
*B64C 25/50* (2006.01)
*B64C 25/36* (2006.01)
*B64C 25/34* (2006.01)

(52) U.S. Cl.
CPC ................. *B64C 25/50* (2013.01); *B64C 25/36* (2013.01); *B64C 2025/345* (2013.01)
USPC .......................................................... 244/50

(58) Field of Classification Search
CPC ....................................................... B64C 25/50
USPC ...... 244/50, 99.2, 99.3, 100 R, 102 A, 103 R, 244/102 SL
See application file for complete search history.

(56) References Cited

U.S. PATENT DOCUMENTS

| 5,242,131 | A * | 9/1993 | Watts ........................ 244/103 W |
| 7,578,466 | B2 * | 8/2009 | Yourkowski et al. ..... 244/102 A |
| 8,136,754 | B2 * | 3/2012 | De Ruffray et al. ............ 244/50 |
| 8,376,267 | B2 * | 2/2013 | Coles et al. ..................... 244/50 |
| 8,668,163 | B2 * | 3/2014 | Colantonio et al. ............ 244/50 |
| 2003/0080243 | A1 * | 5/2003 | Hoisignton et al. ............ 244/13 |
| 2003/0188529 | A1 * | 10/2003 | Collet et al. .................... 60/405 |
| 2010/0078517 | A1 | 4/2010 | Coles et al. |
| 2011/0215192 | A1 * | 9/2011 | Colantonio et al. ............ 244/50 |
| 2012/0305703 | A1 * | 12/2012 | Bennett ..................... 244/102 R |
| 2012/0318909 | A1 * | 12/2012 | Bennett ........................... 244/50 |
| 2013/0146704 | A1 * | 6/2013 | Menezes et al. ................ 244/50 |
| 2013/0186998 | A2 * | 7/2013 | Bennett ..................... 244/102 R |

FOREIGN PATENT DOCUMENTS

| GB | 2477758 | 8/2011 |
| WO | WO 2006/071262 | 6/2006 |
| WO | WO 2011/098745 | 8/2011 |

OTHER PUBLICATIONS

Search Report for GB 1110635.8, dated Sep. 20, 2011.

* cited by examiner

*Primary Examiner* — Philip J Bonzell
(74) *Attorney, Agent, or Firm* — Nixon & Vanderhye P.C.

(57) ABSTRACT

The invention provides an aircraft landing gear arrangement, comprising a bogie including a steerable axle pivotally mounted to said bogie. A locking mechanism is provided to lock the steerable axle in the straight ahead position, where the locking mechanism includes an over-center linkage arrangement.

14 Claims, 7 Drawing Sheets

PRIOR ART

AIRCRAFT LANDING GEAR

BACKGROUND OF THE INVENTION

The present invention concerns aircraft landing gear. More particularly, but not exclusively, this invention concerns multi-wheel landing gears comprising at least one steerable axle. The invention also concerns a locking mechanism for a multi-wheel landing gear bogie including a steerable axle.

Multi-wheel landing gears are often used on large aircraft, for example the Airbus A380. The multi-wheel landing gears are used to support the large loads exerted on the landing gears by the aircraft when taxiing, at take-off, and landing. In order to prevent excess tyre wear caused by tyre scrubbing during taxiing, the multi-wheel landing gear may include at least one pair of wheels mounted on a steerable axle. When not taxiing, and during take-off and landing, it is necessary to lock the steerable axle in the straight ahead position. An example of such a locking system is disclosed in US2010/0078517. US2010/0078517 discloses a spring loaded, wedge shaped, locking mechanism that is arranged to engage with a receiving portion formed in the steerable axle.

Figure 1:
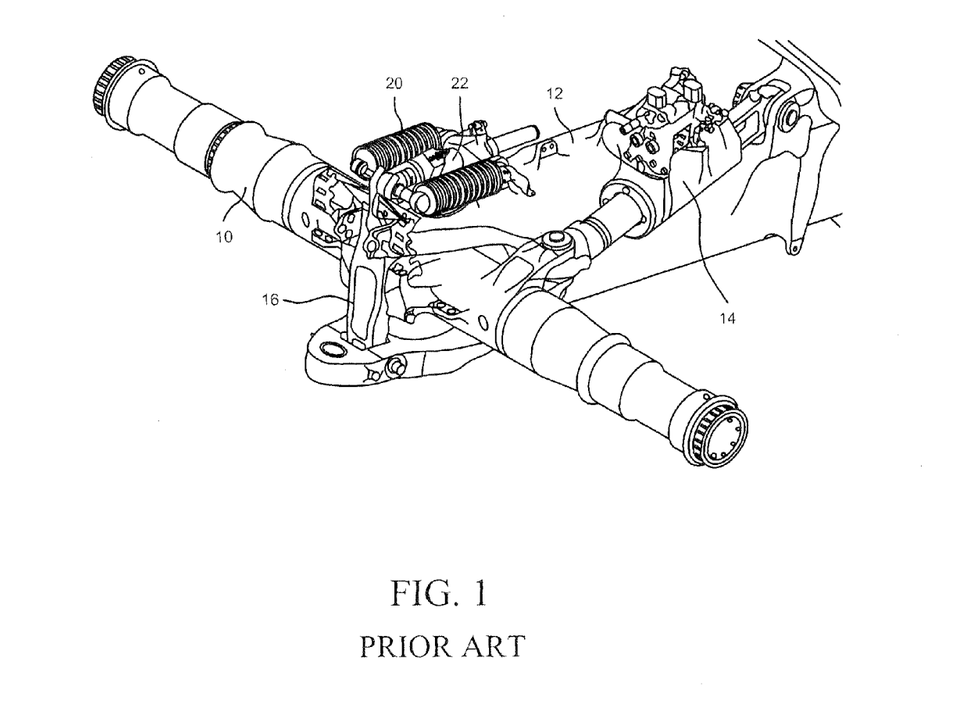
FIG. 1 shows a schematic view of a landing gear steered axle arrangement according to the prior art.
Figure 2:
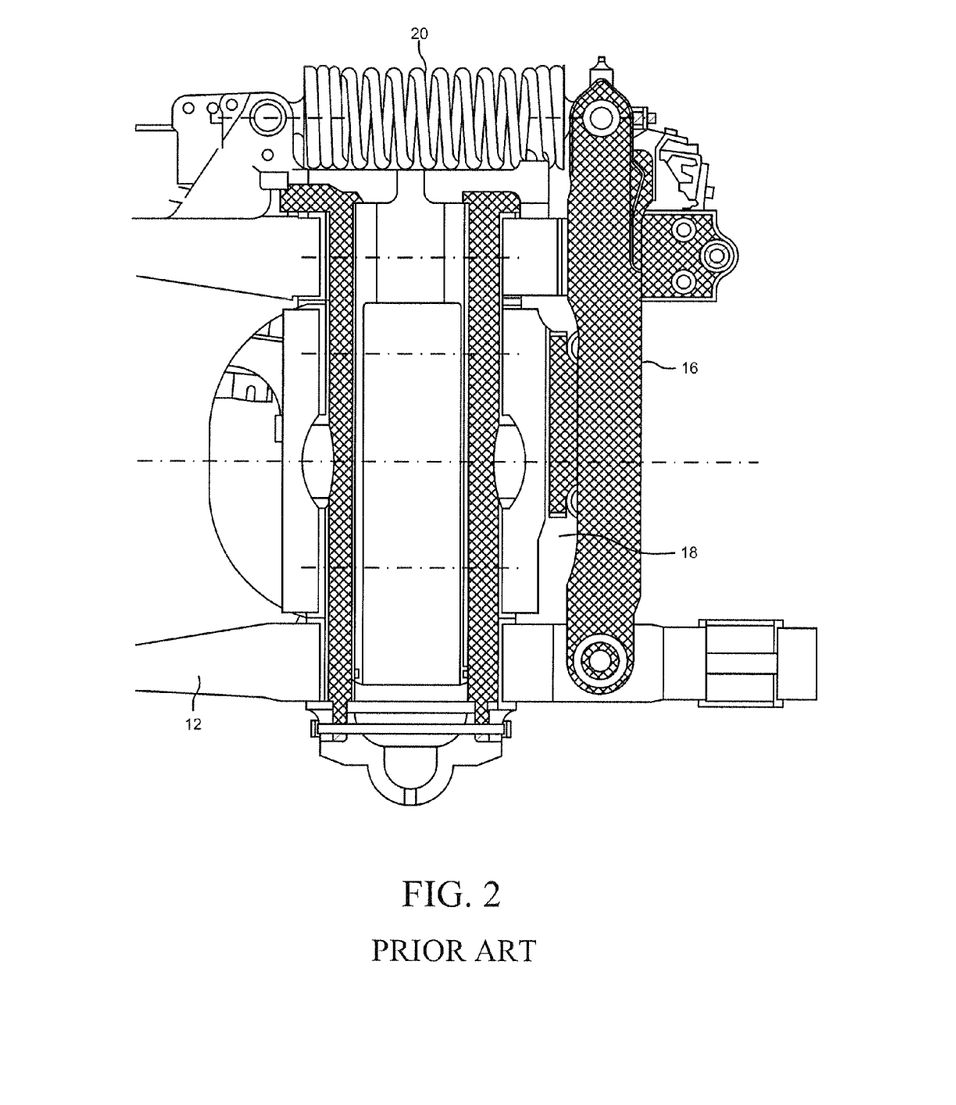
FIG. 2 shows a side view of a landing gear steered axle arrangement according to the prior art.

FIGS. 1 and 2 show a landing gear arrangement according to the prior art. As can be seen, the steerable axle 10 is pivotally mounted to the landing gear bogie 12. The steerable axle 10 is steerable by an actuator 14 which may extend and retract in order to change the orientation of the steerable axle. The landing gear arrangement includes a locking mechanism that comprises a wedge-shaped locking member 16 that is pivotally mounted to the landing gear bogie 12. The wedge-shaped locking member 16 is arranged to be received by a receiving portion 18 of the steerable axle 10 in order to lock the steerable axle 10 in a 'straight ahead' position for taxi, take off, and landing. The wedge-shaped locking member is secured in the locking position by two springs 20 that act to pull the wedge-shaped locking member into the receiving portion. An actuator 22 is arranged to act against the springs 20 in order to move the wedge-shaped locking member from being received within the receiving portion 18, such that the steerable axle 10 is unlocked and pivotal movement, away from the straight ahead position, is allowed.

However, such an arrangement is reliant on the strength of the springs to maintain the steerable axle in a lock configuration, and as the springs contract into the locked position, the force they exert on the locking member decreases. Additionally, if the locking member is not precisely lined up with the receiving portion when attempting to lock the steerable axle, the friction created between the locking member and the receiving section may be too great for the springs acting on the locking member to overcome, such that the steering axle is not fully locked. If the steering axle is not fully locked, the aircraft is not able to take off until the problem is fixed, which may cause delays to the aircraft departure time or the grounding of the aircraft.

The present invention seeks to mitigate the above-mentioned problems. Alternatively or additionally, the present invention seeks to provide an improved landing gear mechanism.

SUMMARY OF THE INVENTION

The present invention provides an aircraft landing gear comprising a bogie;
at least one steerable axle pivotally mounted to the bogie; and
a locking mechanism;
wherein the locking mechanism comprises a first locking member arranged to be movable between a locked position in which the first locking mechanism is engaged with the steerable axle such that pivotal movement of the steerable axle is restricted, and an unlocked position in which pivotal movement of the steering axle is allowed;
and an over-centre linkage arrangement arranged to move the first locking member between the locked position and unlocked position.

Advantageously, providing an embodiment of the invention with an over-centre linkage arrangement provides a locking mechanism that cannot be back-driven when in the locked position.

The over-centre linkage arrangement may comprise a spring, the spring arranged to bias the over-centre linkage to move the first locking member to the locked position. Advantageously, according to an embodiment of the invention, the over-centre linkage arrangement magnifies the return forces of the spring. The over-centre linkage arrangement may comprise an actuator arranged to drive the movement of the over-centre linkage arrangement to move the first locking member between the locked position and unlocked position. The actuator may be arranged to act against the bias of the springs in order to drive the over-centre linkage arrangement such that the first locking member is moved to the unlock position. The actuator may be a pneumatic, hydraulic, or electric actuator. The actuator may be arranged such that when the actuator is unpowered, the spring acts to move the first locking member into the locked position. Advantageously, such an embodiment according to the invention provides a mechanical lock even when power is unavailable.

Preferably, the over-centre linkage arrangement is in geometric lock when the first locking member is in the locked position. Preferably, the over-centre linkage arrangement includes an amount of "lost motion" such that the linkage is driven to break the geometric lock with no immediate movement of the first locking member.

The locking mechanism may include a sensor or plurality of sensors. A sensor may be arranged to monitor the condition of the locking mechanism, in particular whether the first locking member is in a locked or unlocked state. A sensor may be arranged to monitor the condition of the over-centre linkage arrangement. A sensor may be arranged to provide an indication of whether the over-centre linkage arrangement is in geometric lock. Advantageously, according to an embodiment of the invention, in order to move the first locking member from a locked position to an unlocked position, the over-centre linkage arrangement is arranged such that the over-centre linkage arrangement must move a greater distance than first locking member is moved between the locked position and unlocked position. A sensor may be arranged to indicate that the over-centre linkage arrangement has moved from a geometric lock position before the movement of the over-centre linkage arrangement has affected the position of the first locking member. Such an arrangement may advantageously indicate that the locking mechanism is in an 'unsafe' position before the first locking member is actually out the locked position.

According to an embodiment of the invention, the first locking member may be a wedge-shaped member. The first locking member may be arranged to be received in a receiving portion of the steerable axle such that pivotal movement of the steerable axle is restricted or prevented. The first locking member may be pivotally connected to the bogie and move between the locked position and unlocked position by movement about the pivot.

An embodiment of the invention also provides a method of locking a landing gear, the landing gear substantially as described above, wherein a first locking member is moved from an unlocked position to a locked position by an over-centre linkage arrangement moving into geometric lock.

An embodiment of the invention also provides a method of unlocking a landing gear, the landing gear substantially as described above, wherein a first locking member is moved from a locked position to an unlocked position by an over-centre linkage arrangement moving out of geometric lock.

A further embodiment of the invention provide a kit of parts suitable for retrofitting to an aircraft landing gear, the kit of parts comprising an over-centre linkage arrangement, such that the retrofit produces a landing gear as described above.

A further embodiment of the invention provides an aircraft comprising a landing gear as described above.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 3:
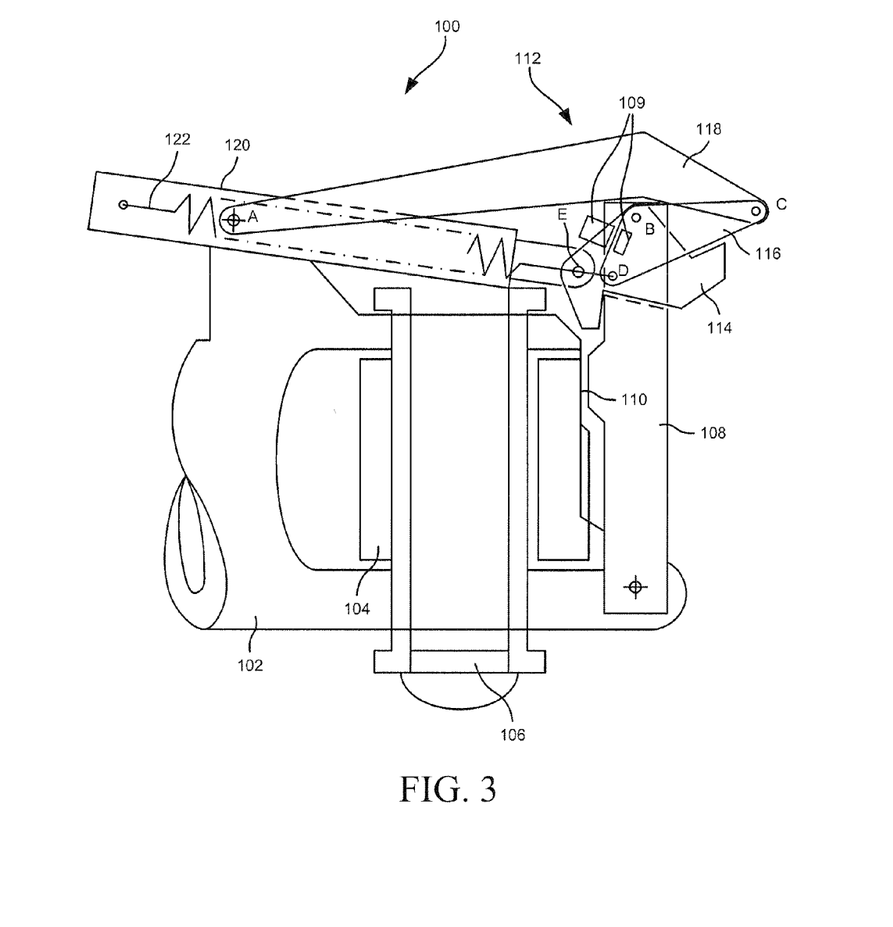
FIG. 3 shows a side view of a landing gear steered axle according to a first embodiment of the invention, the landing gear being in the fully locked position.

FIG. 3 shows a partial view of a landing gear according to a first embodiment of the invention, the view corresponding to that shown in FIG. 2 for the prior art landing gear. Other than the locking arrangement which will be described below, the landing gear arrangement, for example the steering actuator, is substantially as described for the prior art.

Figure 5:
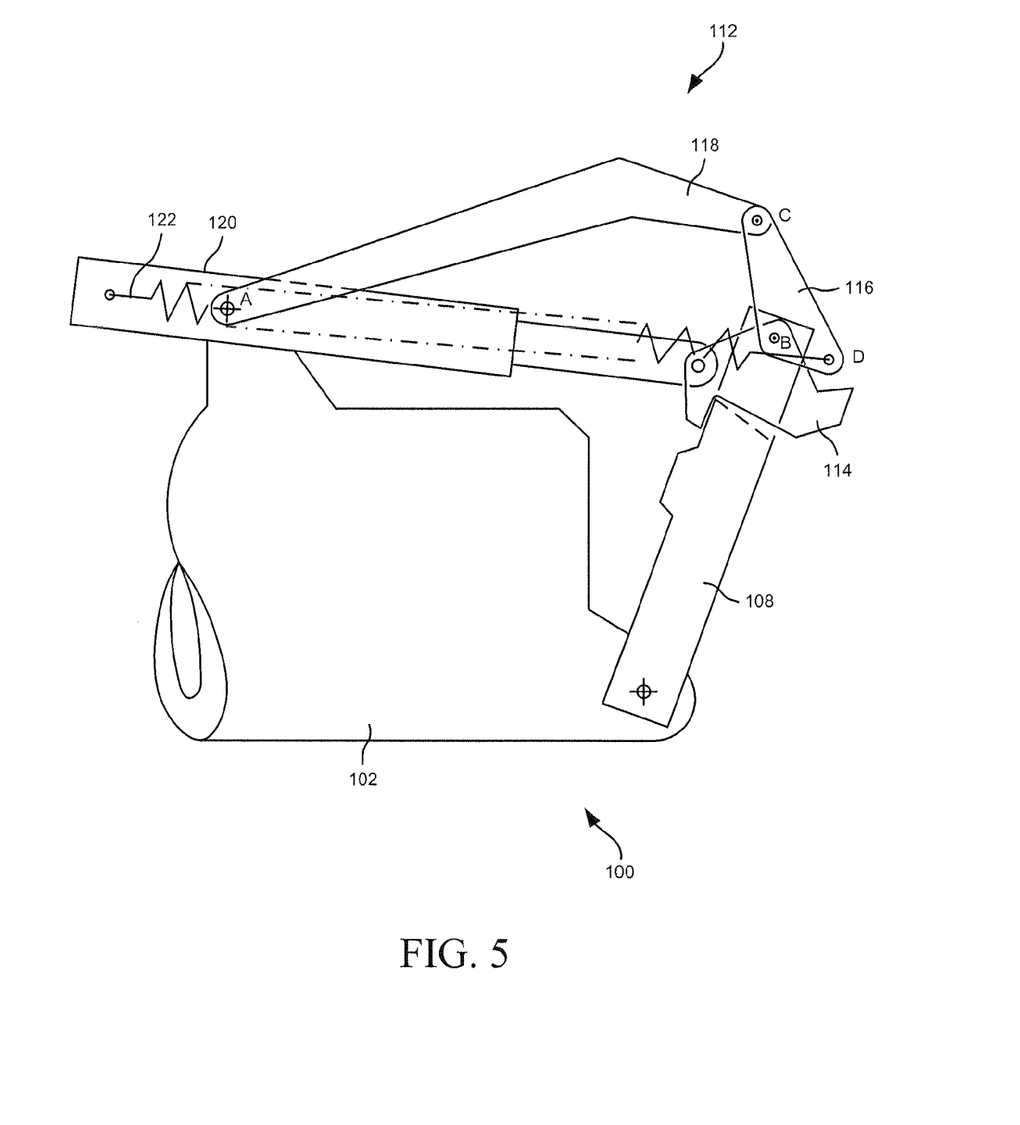
FIG. 5 shows a side view of a landing gear steered axle according to the first embodiment of the invention, the landing gear shown in the unlocked position—as with FIG. 4, only the locking mechanism is shown for clarity.

FIG. 3 shows a landing gear arrangement 100 comprising a landing gear bogie 102 and a steerable axle 104 pivotally connected to the bogie 102 at pivot point 106. The landing gear arrangement also comprises a first locking member 108 that is pivotally mounted to the landing gear bogie 102 and arranged to be received within a receiving portion 110 of the steerable axle 104 such that it restricts or prevents pivotal movement of the steerable axle 104 and locks the steerable axle 104 in the straight ahead position. The first locking member 108 is associated with an over-centre linkage arrangement 112. The over-centre linkage arrangement 112 is arranged such that it may actuate the first locking member 108 about the pivotal connection between the landing gear bogie 102 and the first locking member 108, moving the first locking member 108 from the locked position, as described above, and shown in FIG. 3, and an unlocked position as shown in FIG. 5. In the unlocked position as shown in FIG. 5, the first locking member 108 is no longer received within the receiving portion 110 and does not prevent the pivotal movement of the steerable axle 104. The over-centre linkage arrangement 112 comprises a bell crank 114, a short link 116, and a long link 118. The bell crank 114 is pivotally mounted at pivot B to the first locking member 108 and rotation of the bell crank about the pivot B either pulls the first locking member 108 towards the receiving portion 110, or pushes the first locking member 108 away from the receiving portion 110. The bell crank 114 is connected to an actuator 120 at pivot E, and the actuator is arranged to rotate the bell crank about pivot B by extension or contraction. The actuator 120 is connected to the landing gear bogie at pivot point A. The actuator 120 may be a hydraulic actuator or pneumatic actuator. Alternatively, the actuator may be electrically powered.

The short link 116 is pivotally mounted to the bell crank 114 and the long link 118, and the first locking member 108. The pivot C indicates the connection between the short link 116 and the long link 118. The short link 116 is also connected to a spring 122 at point D. The long link 118 is also pivotally mounted to the landing gear bogie at pivot point A as indicated in the figures. It should be noted that the figures show only one side of the landing gear locking mechanism. In order to provide an independent dual load path, and to equalise the forces on the first locking member 108, the landing gear comprises two over-centre linkage and spring arrangements, one each side of the first locking member 108. However, as the arrangements are symmetrical, only one side will be described.

As can be seen in FIG. 3, when the first locking member 108 is in the locked position, the three pivots, A, B, and C of the over-centre linkage arrangement 112 are in an approximately straight line, such that the over-centre linkage arrangement is in a geometric lock. The spring 122 acts on the short link 116 and biases the over-centre linkage arrangement towards the geometric lock. When the over-centre linkage arrangement is in the geometric lock position, the first locking member 108 is securely located within the receiving portion 110 and the geometric lock of the over-centre linkage arrangement means that the first locking member cannot be back driven without the geometric lock of the over-centre linkage arrangement being deliberately broken. The actuator 120 may be locked in position, may be driven to pull backwards and act to assist the spring 122 in keeping the over-centre linkage arrangement in place, or may be unpowered, with the security of the over-centre linkage arrangement depending only on the spring 122 and the geometric lock configuration.

Figure 4:
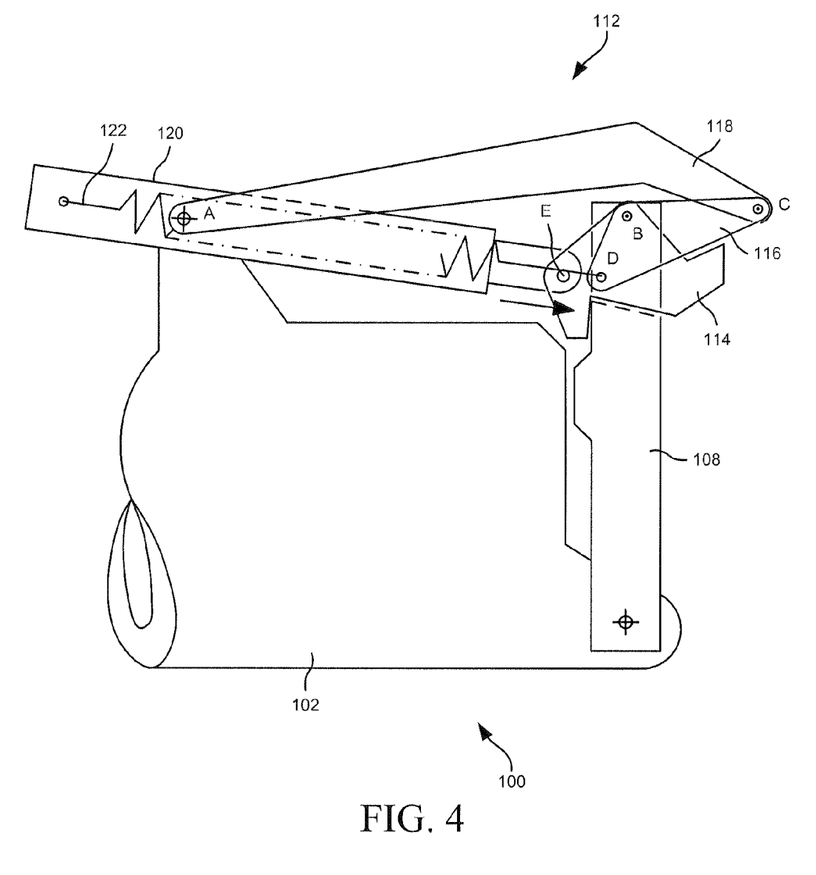
FIG. 4 shows a side view of a landing gear steered axle according to the first embodiment of the invention, the landing gear with the over-centre linkage arrangement partially broken but with the first locking member remaining in the locked position—only the locking mechanism is shown for clarity.

In order to move to the first locking member 108 to the unlocked position, the actuator 120 is powered to drive the bell crank 114 to rotate about the pivot B and push the first locking member 108 out of engagement with the receiving portion 110. The bell crank 114 is designed to rotate a small angle breaking the geometric lock of the over-centre linkage arrangement 112 prior to coming into contact with the first locking member 108. This can be considered "lost motion"

and FIG. 4 shows the bell crank 114 as it comes into contact with the first locking member 108. It can be seen in FIG. 4 that the first locking member is still in the locked position, though the over-centre linkage arrangement is no longer in geometric lock as shown in FIG. 3. A sensor 109 may be mounted to detect the lost motion and indicate that the landing gear is not fully locked (i.e. the first locking member 108 in the locked position and the over-centre linkage arrangement in geometric lock, as shown in FIG. 3), while the first locking member remains in a safe, locked position. The sensor 109 may be located to monitor the movement of the short link 116 in order to provide this function. The sensor 109 may be arranged to communicate with the cockpit of the aircraft to which the landing gear is attached. This is desirable to increase the safety of the landing gear arrangement and comply with aircraft safety regulations.

Figure 6:
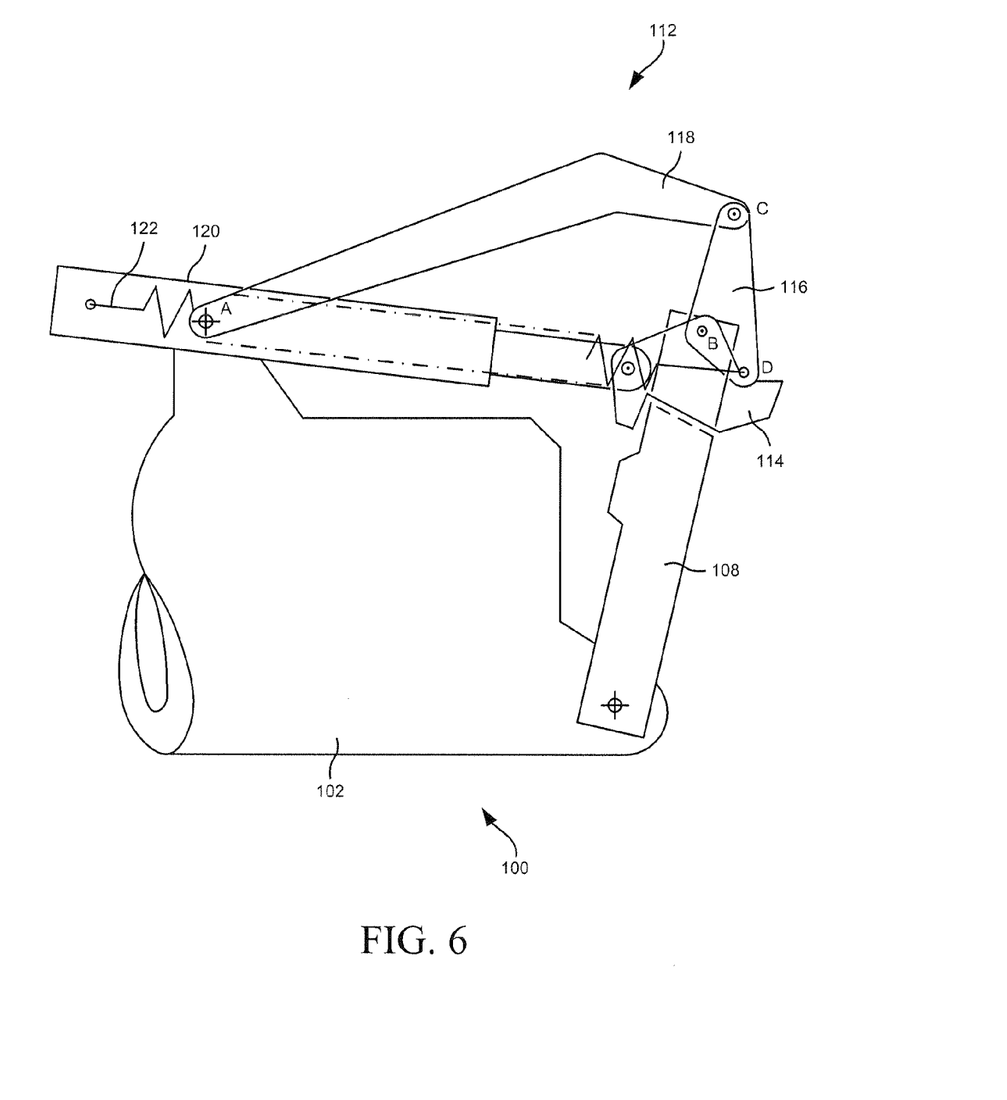
FIG. 6 shows a side view of a landing gear steered axle according to the first embodiment of the invention, the landing gear shown in the returning to lock position—as with FIGS. 4 and 5, only the locking mechanism is shown for clarity.
Figure 7:
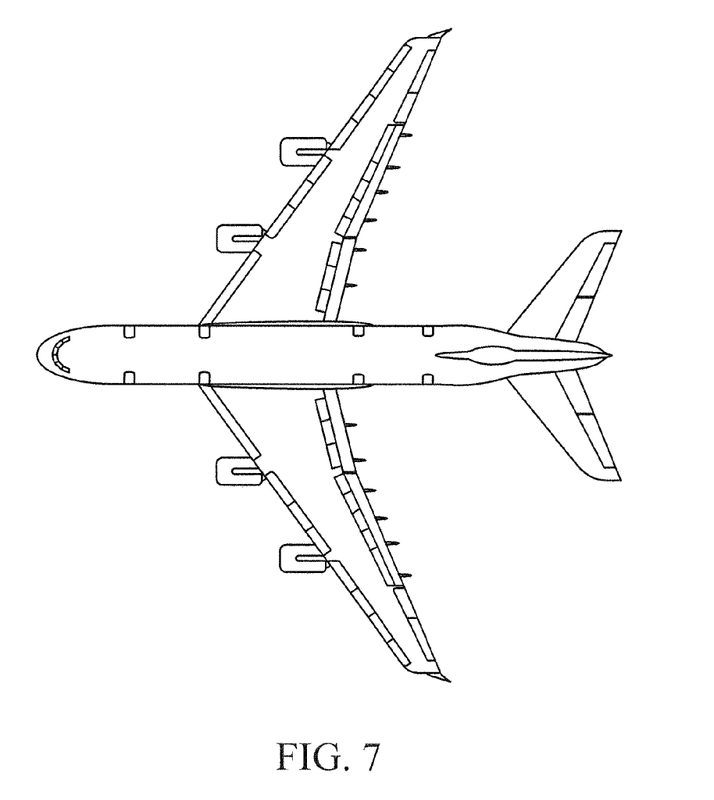
FIG. 7 shows an aircraft which includes a landing gear steered axle according to the invention.

As the actuator 120 continues to drive the bell crank 114 the first locking member 108 is pushed out of engagement with the receiving portion 110, thus moving the first locking member 108 into the unlocked position, thereby allowing pivotal movement of the steerable axle 104. In order to return the first locking member 108 to the locked position, thereby preventing pivotal movement of the steerable axle 104, the actuator is reversed so that it pulls the first locking member 108 towards the receiving portion 110 as shown in FIG. 6. The over-centre linkage arrangement 112 returns to the over-centre position, with the over-centre linkage arrangement amplifying the force exerted by the spring 122 on the first locking member 108. The spring 122 is arranged to constantly act on the short link 116, attempting to move the short link 116 back to the locked position. Therefore, in order for the first locking member 108 to remain in the unlocked position, the actuator 120 must constantly be powered to act against the spring 122. If the actuator becomes unpowered, the spring 122 acts to return the over-centre linkage arrangement 112 to the geometric lock position and return the first locking member 108 to the locked position. The amplification of the spring force by the over-centre linkage arrangement may act to locate the first locking member 108 in the receiving portion 110 even when the steerable axle 104 is not in the straight ahead position. The receiving portion 110 and/or the first locking member 108 may include angled side portions in order to assist with the location of the first locking member 108 into the receiving portion 110 when the steerable axle 104 is not in the straight ahead position.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The steerable axle may be the front axle on a multi-axle landing gear, or the rear axle on a multi-axle landing gear. A landing gear may comprise a plurality of steerable axles and locking mechanisms as described above.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft landing gear comprising a bogie;
   at least one steerable axle pivotally mounted to the bogie; and
   a locking mechanism;
   wherein the locking mechanism comprises a first locking member arranged to be movable between a locked position in which the first locking member is engaged with the steerable axle such that pivotal movement of the steerable axle is restricted, and an unlocked position such that pivotal movement of the steering axle is allowed; and
   an over-centre linkage arrangement arranged to move the first locking member between the locked position and unlocked position.

2. A landing gear as claimed in claim 1, the over-centre linkage arrangement comprising a spring, the spring arranged to bias the over-centre linkage arrangement to the move the first locking member to the locked position.

3. A landing gear as claimed in claim 1, wherein the first locking member comprises a wedge-shaped member.

4. A landing gear as claimed in claim 1, wherein in the locked position, the first locking member is arranged to be received in a receiving portion of the steerable axle.

5. A landing gear as claimed in claim 1, wherein the first locking member is pivotally connected to the bogie and moves between the locked position and unlocked position by movement about the pivot.

6. A method of unlocking a landing gear, the landing gear as claimed in claim 1, wherein first locking member is in the locked position, comprising the steps of:
   an actuator acting on the first locking member via the over-centre linkage arrangement so as to move the first locking member from the locked position to an unlocked position.

7. A method of locking a landing gear, the landing gear as claimed in claim 1, wherein the first locking member is in an unlocked position, comprising the steps of:
   the over-centre linkage arrangement acting on the first locking member so as to move the first locking member from the unlocked position to a locked position.

8. A kit of parts suitable for retrofitting to an aircraft landing gear, so as to result in a landing gear arrangement as claimed in claim 1, the kit of parts comprising an over-centre linkage arrangement.

9. An aircraft comprising a landing gear arrangement as claimed in claim 1.

10. A landing gear as claimed in claim 1, the over-centre linkage arrangement comprising an actuator arranged to drive the movement of the over-centre linkage arrangement to move the first locking member between the locked position and unlocked position.

11. A landing gear as claimed in claim 10, the actuator being arranged to act against the bias of a spring in order to drive the over-centre linkage arrangement such that the first locking member is moved to the unlock position.

12. A landing gear as claimed in claim 10, the actuator being arranged such that when the actuator is unpowered, a spring acts to move the over-centre linkage arrangement such that the first locking member moves into the locked position.

13. A landing gear as claimed in claim 1, comprising a sensor, the sensor being arranged to monitor the condition of the locking mechanism.

14. A landing gear as claimed in claim 13, wherein the sensor is arranged to indicate that the over-centre linkage arrangement has moved position before the said movement has affected the position of the first locking member.

* * * * *